Patented Aug. 25, 1953

2,650,240

UNITED STATES PATENT OFFICE 2,650,240

TRICHLORO METHYL THIOCYANATE AND PROCESS FOR PREPARING SAME

John F. Olin, Grosse Ile, Mich., assignor to Sharples Chemicals Inc., a corporation of Delaware No Drawing. Application April 5, 1950, Serial No. 154,200

11 Claims. (Cl. 260—454)

This invention relates to chlorinated organic thiocyanates, and more particularly to trichloromethyl thiocyanate, a new composition of matter possessing the formula $Cl_3CSCN$. This compound is noteworthy in that the trichloromethyl group and the thiocyanate group are directly linked to each other. The prior art reports compounds which might be considered to have a formal relationship to the compound of this invention, in the sense that the earlier compounds contain a trichloromethyl group and a thiocyanate group in the same molecule. The relationship is quite superficial, however, since in all such compounds of the prior art, the trichloromethyl and thiocyanate group are separated from each other by various divalent organic radicals. This marked structural difference between the present compound and the older compounds results in important differences in chemical, physical, and biological behavior.

It is an object of the invention to provide the chemical art with trichloromethyl thiocyanate, heretofore unknown. It is a further object to provide a process by which said compound may be manufactured.

These and other objects will become apparent in the following description.

It has been discovered that trichloromethyl thiocyanate can be prepared by reacting trichloromethanesulfenyl chloride (sometimes referred to as perchloromethyl mercaptan) with hydrogen cyanide, in accordance with the following equation:

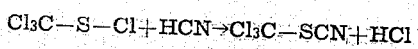

The trichloromethanesulfenyl chloride used as intermediate may be prepared by any means known to the art, or by modifications thereof. For example, satisfactory results may be had by chlorinating carbon disulfide in the presence of a small amount of iodine as catalyst, at ordinary temperature and for a period of time sufficient to complete the reaction. The crude product obtained therefrom may be purified by any suitable means, such as by distillation under reduced pressure.

Thus a typical preparation of trichloromethanesulfenyl chloride was conducted as follows. Iodine (3.5 g.) was dissolved in 700 g. of carbon disulfide, and about 1600 g. of chlorine in vapor phase was slowly introduced into this solution over the course of 24 hours. The reaction mixture was maintained between 15° C. and 20° C. The resulting crude material was distilled through an efficient fractionating column. There was thus obtained 1015 g. of trichloromethanesulfenyl chloride which boiled at 79-80° C. (90 mm.).

The form and/or source of the hydrogen cyanide are of no particularly moment and may be varied as desired, provided that said compound is brought into contact with trichloromethanesulfenyl chloride under conditions favorable to causing the desired reaction to proceed at a reasonable rate. The reactants are preferably employed in substantially stoichiometrically equivalent ratio, although other ratios may be employed without detriment other than the usual desirability of recovering the unused portion of that reactant which is in excess.

Thus hydrogen cyanide may be used per se, either in liquid or vapor phase. If employed in vapor phase, it is recommended that the trichloromethanesulfenyl chloride likewise be in vapor phase, in order to cause intimate contact between the reactants. It is somewhat less preferable to maintain the trichloromethanesulfenyl chloride in substantially liquid phase, while passing a stream of hydrogen cyanide gas through said liquid. In the latter case, if desired, a solvent or diluent may be provided for the liquid trichloromethanesulfenyl chloride, although this is not necessary. It is of course understood that such solvent or diluent may be one in which hydrogen cyanide is soluble or insoluble, and that it preferably should be substantially inert to both reactants. In such operations, temperature and pressure relationships are usually maintained such that the hydrogen cyanide remains in vapor phase.

Hydrogen cyanide per se may also be employed in liquid phase, either in the presence or absence of a mutual solvent or diluent which preferably is substantially inert toward the reactants. When operating in the liquid phase with the reaction system at atmospheric pressure, it is preferred to maintain the temperature below the boiling point (26° C.) of hydrogen cyanide, although somewhat higher temperatures may be employed if efficient condensing means are provided. The reaction may be conducted at temperatures as low as —10° C., or lower, provided the reaction mixture is sufficiently fluid to maintain contact between the reactants. By the use of superatmospheric pressures, temperatures up to say 100° C. may be employed. Temperatures somewhat higher than 100° C. may also be employed, but are less preferred, owing to the possible decomposition of trichloromethanesulfenyl chloride and/or trichloromethyl thiocyanate at these higher temperatures. Reaction temperatures from −10° C. to 26° C. are preferred.

Hydrogen cyanide per se need not necessarily be used. In fact, it is entirely feasible and is often advantageous to generate the hydrogen cyanide within the reaction mixture, merely by the use of appropriate reagents. When this is done it is advisable that the reaction mixture shall contain, or that there be added thereto as needed, a substance which is capable of reacting with and thereby effectively destroying the hydrogen chloride which is formed by reaction of hydrogen cyanide and trichloromethanesulfenyl chloride. Such a substance is called an acid acceptor. It has been discovered that yields of trichloromethyl thiocyanate are improved by the use of an acid acceptor.

An excellent procedure comprises generating hydrogen cyanide by adding an inorganic cyanide to a lower aliphatic monobasic acid. Inorganic cyanides generally may be employed, although alkali metal and/or alkaline earth cyanides, and particularly those of sodium, potassium, and calcium are preferred. The latter are low in cost and readily available. The lower aliphatic saturated monobasic acids in general, such as formic acid, acetic acid, propionic acid, butyric acid, isobutyric acid, the various valeric acids, etc., are advantageously employed, and also simple substituted derivatives of such acids, such as chloroacetic acid and alpha-chlorobutyric acid. It is preferred to employ the aliphatic acid in considerable excess over the amount required for stoichiometric reaction with the inorganic cyanide, the excess acid serving as a solvent or diluent for reactants and products.

The desired amount of trichloromethanesulfenyl chloride is added, in a single portion or preferably in small, multiple portions, to the inorganic cyanide-aliphatic acid mixture, and this reaction system is maintained for such time and at such temperature as will cause the reaction to proceed to completion. The same considerations as to temperature and pressure apply as have already been described when hydrogen cyanide per se is employed in liquid phase.

If desired, variations in the order of mixing the ingredients of the reaction mixture may be practiced. Thus a solution of trichloromethanesulfenyl chloride in the aliphatic acid may be prepared, and the inorganic cyanide added thereto.

Using the specific case of an acetic acid-potassium cyanide-trichloromethanesulfenyl chloride reaction system illustratively, the overall reaction can be written thus:

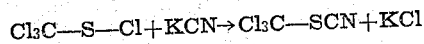

This equation, however, does not depict the actual reaction mechanism, which probably proceeds through a series of reactions as shown in the following equations:

(1) $CH_3COOH + KCN \rightarrow HCN + CH_3COOK$
(2) $Cl_3C-S-Cl + HCN \rightarrow Cl_3C-SCN + HCl$
(3) $CH_3COOK + HCl \rightarrow CH_3COOH + KCl$ It will be noted that potassium acetate, formed in Reaction 1, destroys hydrogen chloride in Reaction 3 by conversion of the latter to potassium chloride, that is, potassium acetate functions as an acid acceptor. Potassium chloride is essentially insoluble in the reaction mixture, this insolubility assisting in causing the reaction to proceed to the right. Destruction of hydrogen chloride is beneficial in aiding Reaction 2 to proceed to the right.

Another means of generating hydrogen cyanide comprises adding an acidic substance, such as an inorganic or organic acid, to an aqueous solution or suspension of inorganic cyanide. This substance should of course possess sufficient acid strength that it is capable of reacting with the inorganic cyanide. It is advisable that said acidic substance be added in slight excess in order to maintain the reaction mixture in acid condition. This is desirable because trichloromethanesulfenyl chloride is more or less rapidly destroyed in alkaline solution, probably by hydrolysis.

To the acidic aqueous solution of "generated" hydrogen cyanide there is added the desired quantity of trichloromethanesulfenyl chloride, which may be added in a single portion, or preferably in small, multiple portions. As the reaction proceeds, a basic material is slowly added in order to serve as acid acceptor for the hydrogen chloride formed in the reaction. Various basic materials may be used. Alkali metal hydroxides such as sodium hydroxide are excellent. The addition of base should not be large enough to allow the reaction mixture to become alkaline. During the course of the reaction, the system is preferably maintained at comparable conditions of temperature and pressure as when hydrogen cyanide per se is employed in liquid phase. The time of reaction should be sufficient for the reaction to be completed.

In a preferred practice of the invention, potassium and/or sodium cyanide is added to an excess of glacial acetic acid, the temperature of the mixture preferably being below 20° C. so that hydrogen cyanide will not escape. The resulting slurry is stirred while a stoichiometric amount of trichloromethanesulfenyl chloride is slowly added thereto. The system is maintained at atmospheric pressure, and temperature conditions are maintained between −10° C. and 26° C. by means of external cooling. Condensing means are provided in order to return to the system such small amounts of hydrogen cyanide as might otherwise escape. The time of addition of the chloride depends more upon efficiency of external cooling than upon reaction rate, that is, the chloride is added at such a rate that the temperature of the reaction mixture does not exceed 26° C. The time of addition may vary from an hour or two up to several hours, depending on efficiency of cooling. If desired, the reaction mixture may be stirred for an hour or two after the chloride has been added, maintaining temperature conditions substantially the same as during said addition, in order to assure completeness of reaction. The trichloromethyl thiocyanate formed by reaction is soluble in acetic acid, while the potassium chloride is insoluble. The mixture is filtered in order to remove potassium chloride. The filtrate thus obtained is fractionally distilled under reduced pressure. The desired product is thus separated from acetic acid and also from any by-products formed in the reaction.

The following examples illustrate the production of the new compound. Numerous modifications will become apparent to persons skilled in the art, and therefore the examples are not meant to limit the invention to the specific procedures described.

*Example 1*

A solution of hydrogen cyanide in acetic acid was prepared by gradual addition of 163 grams (2.5 moles) of powdered potassium cyanide to 500 cc. of glacial acetic acid which was contained in a 3 liter 3-neck flask provided with a dropping funnel, stirrer, and condenser. During this addition, the mixture was agitated and externally cooled, thus maintaining its temperature below 15° C. With continued cooling, 465 grams (2.5 moles) of trichloromethanesulfenyl) chloride was slowly added in 70 minutes, the temperature of the reaction mixture being maintained between 5° C. and 15° C. After the chloride had all been added, the resulting slurry was stirred for an additional 2.5 hours, temperature being maintained between 5° C. and 10° C. The precipitate of potassium chloride which formed in the reaction was filtered off and the filtrate was distilled through a short, packed column. Trichloromethyl thiocyanate (195 grams, a yield of 44%) was collected at 44–49° C. (11 mm.). The product was a pale yellow fluid, irritating and lachrymatory.

*Example 2*

The same apparatus was used as in Example 1. A solution of 293 grams (4.5 moles) of potassium cyanide in 700 cc. of water was cautiously acidified with 360 cc. of concentrated hydrochloric acid. During the acidification the temperature of the mixture was held below 10° C. by means of external cooling. Trichloromethanesulfenyl chloride (744 grams or 4.0 moles) was gradually added during 1.5 hours. The mixture consisting of two liquid phases was stirred and cooled; the temperature remained below 10° C. Then a solution of 180 grams (4.5 moles) of sodium hydroxide in 680 cc. of water was added with vigorous stirring during 3 hours, the temperature of the mixture being held below 10° C. in the usual manner. Throughout the addition of the caustic, the pH of the mixture remained acidic. The lower layer was separated from the upper aqueous layer, washed with water, dried with calcium chloride, and distilled. Trichloromethyl thiocyanate, collected at 92–3° C. (80 mm.), weighed 207 grams (29% yield).

*Example 3*

A mixture of 7.5 moles of potassium cyanide, 2000 cc. of glacial acetic acid, and 5.0 moles of trichloromethanesulfenyl chloride was reacted as in Example 1. The resulting slurry was filtered and the filtrate was diluted with 1500 cc. of water. This caused separation into two layers. The layers were separated and the upper layer was extracted with three portions of chloroform. This chloroform was combined with the original lower layer. The resulting solution was washed with water, dried with calcium chloride, and distilled. Trichloromethyl thiocyanate collected at 92–93° C. (80 mm.), weighed 386 grams (44% yield).

*Example 4*

A solution of three moles of trichloromethanesulfenyl chloride in one liter of glacial acetic acid was cooled to 0° C. With stirring 3 moles of powdered sodium cyanide was gradually added during 4 hours, the temperature of the reaction mixture being maintained between 0° C. and −3° C. by means of external cooling. Stirring and cooling were continued for ½ hour after addition of the sodium cyanide was completed. The mixture was allowed to stand overnight at about 10° C. It was then filtered to remove sodium chloride, and the filtrate was distilled. Trichloromethyl thiocyanate, collected at 90–93° C. (80 mm.), weighed 173 grams (33% yield).

Trichloromethyl thiocyanate is a pale yellow to straw-colored mobile liquid which possesses a pungent and irritating odor. It is lachrymatory. It is soluble in such organic solvents as methanol, ethyl ether, acetone, ethyl acetate, benzene, and hexane, but is substantially insoluble in water. Certain other important physical properties have been determined as follows:

| | |
|---|---|
| Boiling point | 44–45° C./11 mm. |
| | 64–65° C./25 mm. |
| | 164.5° C./740.8 mm. |
| Freezing point | 2.5° C. |
| Specific gravity | 1.585/20° C. |
| | 1.580/25° C. |
| Refractive index | 1.5222/20° C. |
| Viscosity | 2.55 centipoises/25° C. |
| Specific heat | 0.262 cal./g./° C. at 39° C. |

The chemical composition was determined by analysis for nitrogen, sulfur, and chlorine:

| | N | S | Cl |
|---|---|---|---|
| | Percent | Percent | Percent |
| Found | 7.5 | 18.7 | 58.5 |
| Theoretical for $Cl_3C$—SCN | 7.9 | 18.1 | 60.3 |

The compound of the invention was subjected to infrared analysis. It exhibited the absorption characteristics of organic thiocyanates and not those of organic isothiocyanates.

The compound of this invention possesses marked utility and versatility in the field of pest control. It is an excellent fumigant, as in the fumigation of grain for example, and it is highly effective when used against pests such as undesirable fungi, insects, and nematodes, such as soil nematodes. It exhibits phytotoxic activities, and may be used as a herbicide. It is also useful as an intermediate in chemical synthesis.

Examples of some of such uses follow and this subject-matter is described and claimed in applicant's copending application Serial No. 278,955, filed March 27, 1952, as a continuation-in-part of the present application:

*Example 5*

Two solutions of trichloromethyl thiocyanate in acetone were prepared, each solution representing a different concentration of the active ingredient. A single droplet (0.0016 ml.) of each solution was deposited by means of a Dutky-Fest micropipette onto each of ten houseflies (*Musca domestica*) which had been previously anesthetized with carbon dioxide. The solution containing 5% (by volume) of active ingredient gave 100% kill. The solution containing 0.5% gave a kill of 30%.

*Example 6*

Houseflies (*Musca domestica*) were exposed for a 10 minute period to a mist spray by atomizing 0.25 ml. of trichloromethyl thiocyanate in Deobase (a deodorized kerosene) into a special 5-gallon bottle. In a series of tests, concentrations ranging from 0.5% to 5% of active ingredient were employed. The number of flies used in the tests varied between 75 and 200. The following results were obtained:

| Conc. of Cl₃CSCN | Effect on flies after 1 day, percent dead |
|---|---|
| 0.5% | 42 |
| 0.5% | 28 |
| 1.0% | 50 |
| 1.0% | 100 |
| 1.0% | 100 |
| 2.0% | 100 |
| 2.0% | 100 |
| 5.0% | 100 |
| 5.0% | 91 |

The flies exposed to the 0.5% solution were inactivated after 10 minutes, but were still clinging to the paper in the bottom of the bottle. Most of those exposed to the 1.0% solution were on their backs after 10 minutes, with only a few clinging to the paper. Those exposed to the 2% solution were all down on their backs after 6 minutes, showing only slight movement of appendages; this same effect was produced by the 5% solution after 2 minutes.

Example 7

Houseflies (Musca domestica) were placed in wide-mouthed 5-gallon bottles ("water buckets"), into which various volumes of trichloromethyl thiocyanate were subsequently introduced. Tight metal lids with rubber inserts were used for sealing. Approximately 80.95% of the flies were killed at a concentration of 1 part by volume of active ingredient per 38,000,000 parts of air within one day. At a concentration of 1:7,600,000 all the flies were killed.

In a direct comparative experiment, trichloroacetonitrile either killed or severely affected flies at a concentration of 1:3,800,000.

Example 8

By the procedure of Example 7, adult confused flour beetles (Tribolium confusum) were exposed to trichloromethyl thiocyanate. At a concentration of 1:760,000, 100% of the beetles were killed within one day. At a concentration of 1:1,520,000, all the beetles were severely affected.

In a direct comparative experiment, trichloroacetonitrile killed beetles at a concentration of 1:760,000.

Example 9

Soil in 3-quart jars was treated with trichloromethyl thiocyanate at the following respective concentrations: 0.1 ml., 0.2 ml., 0.4 ml., 0.8 ml., and 1.6 ml. per jar. The soil was badly infested with root-knot nematodes (Heterodera marioni).

In each test, the material was pipetted into a hole extending to about half the depth of the soil, and soil was then brushed into the hole. The jar was sealed and allowed to stand at ordinary room temperature for 9 days. The soil was then transferred to an 8-inch flower pot. A 5-day aeration period was allowed, following which 10 small tomato seedlings were transplanted in the pot.

At the end of 21 days, the roots of the plants were carefully examined for gall formation. No galling occurred at the above 0.8 ml. and 1.6 ml. concentration levels, light galling occurred at 0.4 ml., and there was considerable galling at the lower concentration levels.

Example 10

Slide-spore germination fugicidal tests gave complete inhibition of germination of spores of the peach-rot fungus (Sclerotinia fructicola) and of spores of the apple bitter-rot fungus (Glomerella cingulata.) These tests were conducted in accordance with the American Phytopathological Society method, except that they were continued for three days instead of only one day.

Example 11

Potted young dwarf horticultural bean plants were placed in wide-mouthed 5-gallon bottles. Various volumes of trichloromethyl thiocyanate were then introduced, and the bottles were tightly sealed. The plants were exposed to the vapors of the active ingredient for 41 hours. At a concentration level of 1:19,000,000, the plants were severely injured, and at a level of 1:38,000,000 they were less severely injured.

Control plants exposed in similar bottles for 41 hours were normal.

This experiment, confirmed by other experiments, demonstrate the high phytotoxicity of trichloromethyl thiocyanate.

From the foregoing it will be appreciated that for pesticidal purposes very low concentrations of the active ingredient are effective for terminating the life cycle of various undesirable forms of plant and animal life. The active ingredient may be applied to such forms of life by any convenient means, such as for example, by the use of non-aqueous solutions, or by the use of suspensions, emulsions, and dispersions, aqueous or non-aqueous, or by the use of the active ingredient without diluent.

Compositions containing the active ingredient are applied in any desired form, such as in the form of a solid, for example by dusting, or in the form of a liquid, for example by spraying.

Compositions may be formulated by admixing the active ingredient with any desired liquid or solid carriers such as any of the finely divided solid carriers known in the dusting art, which are preferrably of large surface area, such as a clay, for example, fuller's earth, pyrophyllite, talc, bentonite, kieselguhr, diatomaceous earth, etc. Any of the commercial clays available on the market in finely divided form are highly satisfactory, and particularly those which are normally employed as insecticide carriers. Commercial clays, it will be understood, are generally identified by trade names (reflecting the source and mode of processing) of which Homer clay, celite, and tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soy bean, potato, cotton seed, etc.

Any desired mixture may be prepared by any suitable method. Thus the active material in liquid form, including solutions, dispersions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed it is desirable that the composition be in finely divided form. Preferably the dust containing the active ingredient should be sufficiently fine that substantially all will pass through a 50 mesh sieve, and more particularly through a 200 mesh sieve.

For spray application the active ingredient may be dissolved or dispersed in a liquid carrier. Examples of liquid carriers are water, various oils, and various organic solvents such as for example those above-mentioned solvents in which trichloromethyl thiocyanate is soluble. Suitable oils include those of petroleum, animal, vegetable, or synthetic origin, such as kerosene, fuel oil, lubricating oil, soy bean oil, linseed oil, castor oil, sperm oil, cod liver oil, etc.

In general, the choice of the particular liquid carrier employed may be guided somewhat by prevailing circumstances, such as its availability and cost, and its solubility or dispersion characteristics toward the active ingredient.

Thus spray formulations comprising the active ingredient in the form of a suspension, dispersion, or emulsion in aqueous or non-aqueous media may be employed, or such formulations comprising said ingredient in the form of a non-aqueous solution may likewise be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and non-ionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent may be mixed with the active ingredient prior to admixture with the carrier, and the preparation of the emulsion or dispersion is accomplished at the place where the spraying is to be undertaken merely by agitating said mixture with the carrier, particularly when aqueous. The active ingredient, if not soluble in the carrier in the concentration desired, may be dispersed as such, or may be dissolved in a solvent, and emulsified by agitation with the carrier. This applies particularly when both water and oil are employed in the carrier.

The concentration of surface active agent in the final emulsion or dispersion should be sufficient to make the phases readily dispersible, and in general for this purpose from 0.02% to 2% is satisfactory. Any desired additional amount may be added such as for adjuvant purposes, as will be understood. Thus, if the surface active agent is to be premixed with the active ingredient, the selected relative proportions of the two will largely depend upon the purposes in mind. For mere purposes of forming spray emulsions or dispersions, mixtures containing a surface active agent to the extent of from about 1% to about 25% by weight of active ingredient are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the object which is to be treated. This is particularly true when a plant is to be treated.

The use, if desired, of adjuvants, such as wetting agents and/or humectants, is also contemplated in connection with solutions or dispersions of the active ingredient, such as aqueous dispersions. Any suitable wetting agent and/or humectant may be employed for this purpose, such as the wetting agents more particularly referred to herein. Examples of humectants are glycerine, diethylene glycol, ethylene glycol, polyethylene glycols generally, and well known sugar-containing mixtures, such as corn syrup and honey.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately 0.05% by weight of the spray solution. The use of considerably larger amounts is not based upon wetting properties, although present, but is a function of the physiological behavior of the wetting agent after spraying upon the plant.

It should be considered that once the mixture has been sprayed upon the plant, the concentration of wetting agent existing upon the leaf is in no sense a function of the concentration existing in the original spray mixture. Thus, evaporation might concentrate the wetting agent considerably, or the presence of a dew on the leaf surface, or of plant juices on the leaf surface might considerably dilute this agent.

Wetting agents appear to serve the purposes of aiding in the penetration of the leaf surface by the active ingredient and of spreading of the active ingredient over the leaf area.

Although the active ingredient may be applied in concentrated form, it is usually desirable to employ liquid or solid formulations, for example as discussed above.

Other substances than the carrier and/or surface active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as bactericides, or other fungicides, insecticides, nematocides, or herbicides. The preparation of such additions and the materials added do not require elaboration, but will suggest themselves to persons skilled in the art upon becoming familiar herewith.

Having described the invention, and recognizing that modifications may be practiced which fall within its scope and spirit, I do not wish to be limited except by the scope of the claims.

I claim:

1. Trichloromethyl thiocyanate.
2. A process for the manufacture of trichloromethyl thiocyanate, which comprises reacting trichloromethanesulfenyl chloride with hydrogen cyanide.
3. A process for the manufacture of trichloromethyl thiocyanate, which comprises reacting trichloromethanesulfenyl chloride with hydrogen cyanide, said reaction being conducted in the liquid phase.

4. The process of claim 3 in which the reaction is conducted below 100° C.

5. The process of claim 3 in which temperature conditions are maintained between −10° C. and 100° C.

6. The process of claim 3 in which temperature conditions are maintained between −10° C. and 26° C.

7. The process of claim 3 in which the reaction is conducted in the presence of an acid acceptor for the hydrogen chloride formed during the reaction.

8. The process of claim 7 in which the reaction is conducted below 100° C.

9. The process of claim 7 in which temperature conditions are maintained between −10° C. and 100° C.

10. The process of claim 7 in which temperature conditions are maintained between −10° C. and 26° C.

11. A process for the manufacture of trichloromethyl thiocyanate, which comprises mixing acetic acid, an alkali metal cyanide, and trichloromethanesulfenyl chloride, and agitating said mixture until trichloromethyl thiocyanate is produced.

JOHN F. OLIN.

References Cited in the file of this patent

UNITED STATES PATENTS

| Number | Name | Date |
|---|---|---|
| 2,214,971 | Muller | Sept. 17, 1940 |
| 2,432,255 | Skaptason | Dec. 9, 1947 |
| 2,462,830 | Cass | Mar. 1, 1949 |
| 2,486,090 | Abramovitch | Oct. 25, 1949 |
| 2,572,564 | Himel | Oct. 23, 1951 |

OTHER REFERENCES

Brintzinger: Ber. Deut. Chem., vol. 83, pages 87–90 (February 1950) (abstracted at 44 Chemical Abstracts 5308 h.).